United States Patent
Peterson et al.

(12) 
(10) Patent No.: US 6,602,418 B2
(45) Date of Patent: Aug. 5, 2003

(54) SOLUTION DEWATERING WITH CONCOMITANT ION REMOVAL

(75) Inventors: Eric S. Peterson, Idaho Falls, ID (US); Douglas W. Marshall, Blackfoot, ID (US); Mark L. Stone, Idaho Falls, ID (US)

(73) Assignee: Bechtel BWXT Idaho, LLC, Idaho Falls, ID (US)

(*) Notice: Subject to any disclaimer, the term of this patent is extended or adjusted under 35 U.S.C. 154(b) by 0 days.

(21) Appl. No.: 09/766,985

(22) Filed: Jan. 22, 2001

(65) Prior Publication Data

US 2002/0144947 A1 Oct. 10, 2002

(51) Int. Cl.[7] .................................................. B01D 61/00
(52) U.S. Cl. ........................ 210/640; 210/651; 210/652; 210/500.27; 210/490; 210/653
(58) Field of Search ................................. 210/651, 652, 210/640, 490, 500.27, 653; 427/245

(56) References Cited

U.S. PATENT DOCUMENTS

| | | | |
|---|---|---|---|
| 4,710,204 A | 12/1987 | Kraus et al. | |
| 4,728,345 A | 3/1988 | Murphy | |
| 4,749,489 A | 6/1988 | Allen et al. | |
| 4,813,983 A | 3/1989 | Nohmi et al. | |
| 4,880,441 A | 11/1989 | Kesting et al. | |
| 5,022,996 A | 6/1991 | McCaffrey et al. | |
| 5,066,398 A | 11/1991 | Soria et al. | |
| 5,238,569 A | 8/1993 | Soria et al. | |
| 5,252,212 A | * 10/1993 | McHugh et al. | |
| 5,266,207 A | 11/1993 | Boye et al. | |
| 5,268,287 A | 12/1993 | Matsuki et al. | |
| 5,380,658 A | 1/1995 | Matsuki et al. | 435/181 |
| 5,385,672 A | 1/1995 | Peterson et al. | 210/637 |
| 5,451,322 A | 9/1995 | Nelson et al. | 210/653 |
| 5,753,008 A | * 5/1998 | Friesen et al. | |
| 5,773,384 A | 6/1998 | Davankov et al. | 502/402 |
| 5,783,202 A | 7/1998 | Tomlinson et al. | |
| 5,904,663 A | 5/1999 | Braverman et al. | 604/5 |
| 6,036,030 A | 3/2000 | Stone et al. | 210/490 |
| 6,087,300 A | 7/2000 | Davankov et al. | 502/402 |
| 6,093,325 A | 7/2000 | Stone | 210/654 |

OTHER PUBLICATIONS

Allen, C.A., et al "Separation of Cr Ions From Co and Mn Ions by Poly(Bis(Phenoxy)Phosphazene) Membranes," *Journal of Membrane Science*, vol. 33 (1987) pp. 181–189.

* cited by examiner

*Primary Examiner*—Ana Fortuna
(74) *Attorney, Agent, or Firm*—Clayton Howarth & Cannon

(57) ABSTRACT

One of the biggest needs in the separations and waste handling and reduction area is a method for dewatering ion-containing solutions. Unexpectedly, it has been found that phosphazene polymers can discriminate between water and metal ions, allowing water to pass through the membrane while retaining the ions. This unexpected result, along with the inherent chemical and thermal stability of the phosphazene polymers, yields a powerful tool for separating and dewatering metal-ion-containing solutions.

30 Claims, 2 Drawing Sheets

SOLUTION DEWATERING WITH CONCOMITANT ION REMOVAL

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

This invention relates to separating water and ions from solutions. More particularly, the invention relates to using polymer membranes or films for removing water from solutions or, stated in another way, for removing ions from water.

There are many processes involving the need for the removal of water from a process stream or the removal of contaminants from water streams before the water can be reused or released. Dewatering is of vital interest to the mining industry (e.g., lithium metal mining), the food industry (e.g., brines), the chemical industry (e.g., organics and ion removal), the pharmaceutical industry (e.g., product drying), the medical industry, and many environmental and waste remediation efforts. These separations can, in some cases, be accomplished by distillation. Distillation, however, is energy intensive and is often complicated by the presence of azeotropes. Polymer membranes have been recognized for years as an attractive alternative both energetically and economically. An energy efficient, chemically and thermally stable membrane could have a significant impact on all of these areas. Such a membrane could be used to deacidify water, to be a part of commercial and industrial deionizers, and to deionize distilled water to make ultrapure water for analytical chemistry uses. Unfortunately, the most common polymers used for routine water purification cannot survive the harsh conditions of industrial processes.

In recent years, the technology surrounding membranes and their use, for example in the separation of solutes from solution, has grown from simple laboratory procedures to industrial processes having considerable technical and commercial impact. Membranes are used on a large scale for many applications, among which are production of potable water from sea water by reverse osmosis, cleaning industrial effluents, recovering valuable constituents of solutions by electrolysis, and effecting various medical purposes.

In view of the foregoing, it will be appreciated that providing a method for economically and efficiently removing water or ions from solutions, especially from industrial solutions, would be a significant advancement in the art.

BRIEF SUMMARY OF THE INVENTION

It is an object of the present invention to provide a method of economically and efficiently removing water or ions from solutions.

It is also an object of the invention to provide a method of using a chemically and thermally stable membrane for removing water or ions from solutions.

An illustrative method according to the present invention for separating ions from an aqueous stream containing such ions comprises:

(a) contacting a phosphazene polymer with the aqueous stream such that the ions are substantially prevented from permeating the phosphazene polymer, thereby producing an ion-depleted permeate stream and an ion-enhanced rejectate; and (b) separately collecting the permeate stream and the rejectate.

In a preferred embodiment of the invention the phosphazene polymer is a member selected from the group consisting of linear polyphosphazenes, cyclo-linear polyphosphazenes, cyclo-matrix polyphosphazenes, and mixtures thereof. The phosphazene polymer also preferably comprises side-groups comprising organic functionality. For example, illustrative organic groups include phenoxy and octanoxy substituents.

Another preferred embodiment of the invention comprises a method for removing and concentrating ions from an aqueous ion-containing solution having a first volume comprising:

(a) contacting a phosphazene polymer with the ion-containing solution such that the ions are retained in an ion-enhanced rejectate and an ion-depleted permeate passes through the phosphazene polymer, wherein the ion-enhanced rejectate has a second volume, which is smaller than the first volume; and (b) collecting the ion-enhanced rejectate.

Still another preferred embodiment of the invention comprises a method for dewatering an aqueous ion-containing solution stream comprising:

(a) contacting a phosphazene polymer with the aqueous stream such that the ions are substantially prevented from permeating the phosphazene polymer, thereby producing an ion-depleted permeate stream and an ion-enriched rejectate; and (b) collecting the rejectate.

DETAILED DESCRIPTION

Figure 1:
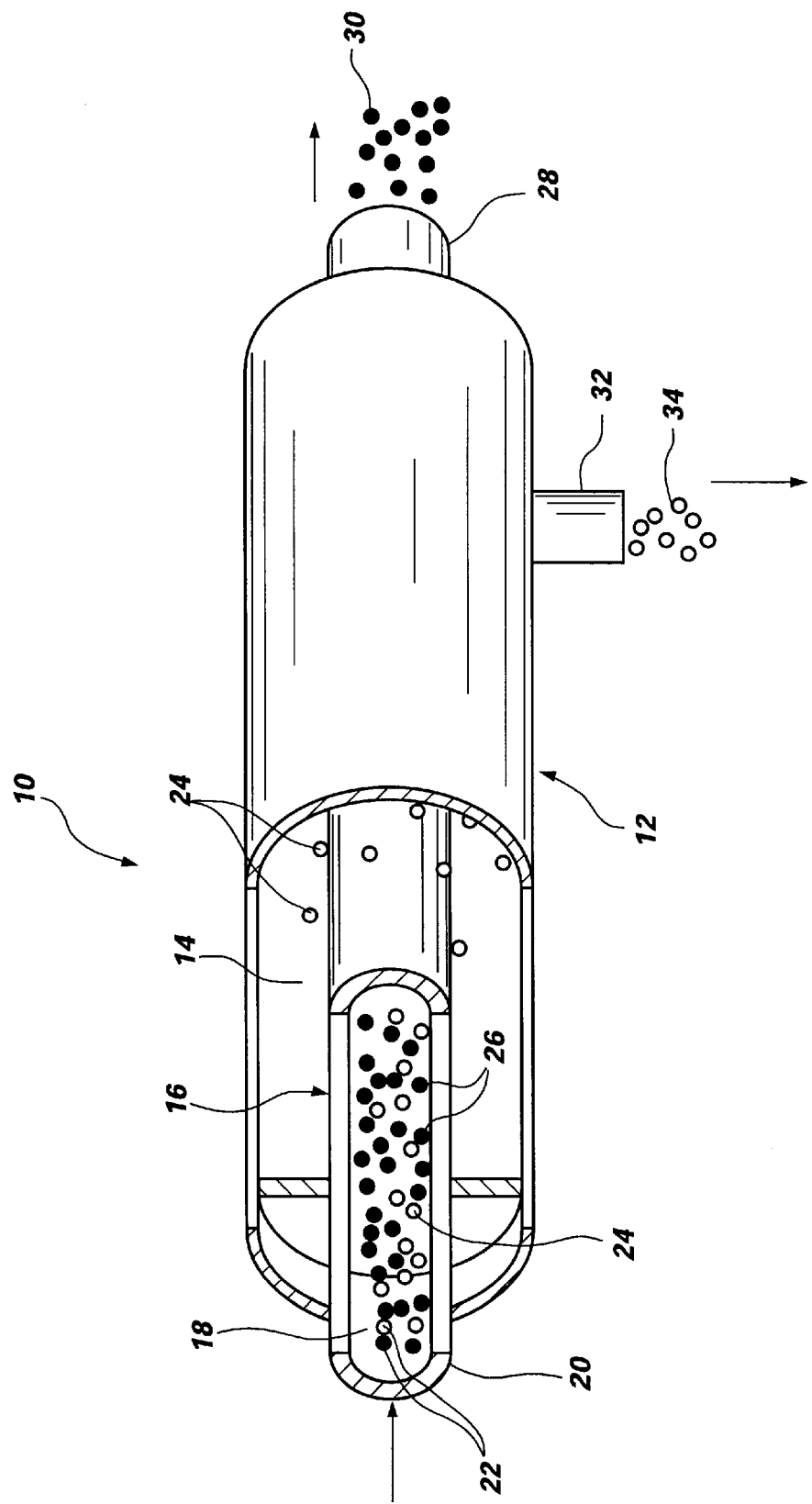
FIG. 1 shows an illustrative apparatus for use in dewatering solutions and/or removing ions from solutions according to the present invention.

Before the present method for removing water and/or ions from solutions is disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise. Thus, for example, reference to "a phosphazene polymer" includes reference to a mixture of two or more phosphazene polymers, reference to "an aqueous stream" includes reference to one or more aqueous streams, and reference to "a side-group" includes reference to two or more side-groups.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of."

As used herein, "consisting of" and grammatical equivalents thereof exclude any element, step, or ingredient not specified in the claim.

As used herein, "consisting essentially of" and grammatical equivalents thereof limit the scope of a claim to the specified materials or steps and those that do not materially affect the basic and novel characteristic or characteristics of the claimed invention.

The present invention relates to removing water or ions from ion-containing aqueous solutions using polymeric membranes. Preferably, this process is carried out by means of pervaporation technology, as is well known in the art of separations. Many polymers known in the art can be used for accomplishing such separations, but preferred polymers include polyphosphazenes, polysiloxanes, polybenzamidizoles, polyethylenes, polypropylenes, polyacrylates, polybutadienes, butyl rubbers, havea rubbers, polyacrylonitriles, polynitriles, polyisorpenes, fluoropolymers, and the like, and mixtures thereof.

An especially preferred embodiment of the invention relates to removing water or ions from solutions using a phosphazene polymer material. Embodiments of the invention include, but are not limited to, using a polyphosphazene membrane in a plain diffuision, pervaporation, or reverse osmosis separation process, which processes are well known in the separation arts and may be adjusted by one skilled in such arts as appropriate to the particular application. A pervaporation separation process is especially preferred.

Polyphosphazenes are defined broadly as a class of polymers having a "backbone" of alternating phosphorus and nitrogen atoms linked by alternating single and double bonds. In addition to the backbone bonding (that is, between P and N), the phosphorus atoms have two additional bonding sites that may be substituted with chemical moieties that are tailored to function in specific applications. Thus, the present invention comprises the use of polyphosphazenes comprising a plurality of

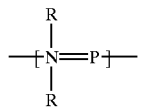

units, wherein the various side groups R may be the same or different.

Many phosphazene polymers have been described in the polymer literature, including linear, cyclo-linear, and cyclo-matrix polymers (e.g., U.S. Pat. No. 4,749,489 to Allen et al.), and including many variations based on differing substituent groups on the phosphorus atoms. Allen et al. describes replacement of the chlorine atoms of a base, un-substituted phosphazene polymer with organic groups such as hydroxyl, primary amine, secondary amine, or mercapto groups. Soria et al. (U.S. Pat. No. 5,066,398) discloses polyalkoxyphosphazenes, polyalkylaminephosphazenes, and polyaryloxyphosphazenes, having substituent groups comprising alkyl groups linked to the phosphorus by oxygen or nitrogen, or comprising benzene or substituted benzene rings linked to the phosphorus by oxygen. Further, Boye et al. (U.S. Pat. No. 5,266,207) discloses many examples of radicals that may be substituent groups on the polyphosphazene phosphorus.

Polyphosphazene chemistry and membrane manufacture is well-known in the polymer art and has been described in such references as Peterson et al., Chemical Separations Using Shell and Tube Composite Polyphosphazene Membranes, 30 Separation Science and Technology 1573–1587 (1995), and Allen et al., Separation of Cr Ions from Co and Mn Ions by Poly(Bis(Phenoxy)Phosphazene) Membranes, 33 Journal of Membrane Science 181–189 (1987). Examples of polyphosphazene synthesis may be found in Allen et al., supra, which shows generalized reaction routes for substitution of side groups on a polyphosphazene backbone and summarizes synthesis of polybis (phenoxy) phosphazene ("PPOP") which results in a polymer solid that is a white, fibrous, flexible, film-forming material that dissolves easily in tetrahydrofuran (THF).

The invented separation process may use various forms of phosphazene polymer layers and various substrates that are known in the art. For example, a thin phosphazene polymer may be knife cast onto a porous substrate that acts as a mechanical support for the thin polymer film. In other applications, the polyphosphazene may be formed into a hollow-fiber system or coated onto an existing sheet or hollow fiber of another polymer type.

The preferred embodiments of the invention use linear phosphazene polymers, which may be described by the general formula (Formula 1) below. The phosphorus atoms each carry two substituents, R, which may be identical or different, and which preferably comprise various organic ligands as described above. The invention may comprise a phosphazene polymer having all substituent groups ($R_1$) being the same, as represented by Formula 2 below, or by a phosphazene polymer having different substituent groups ($R_1$, $R_2$), as represented by Formula 3 below. The relative substitutions of $R_1$ and $R_2$ may be determined by, for example, the relative concentrations of $R_1$ and $R_2$ in the synthesis reaction and, sometimes, by the order in which the backbone is substituted. These phosphazene polymers are represented by the following formulas:

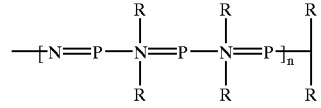

(Formula 1)

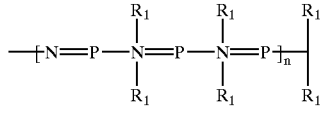

(Formula 2)

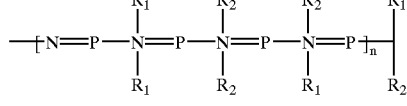

(Formula 3)

wherein n is at least 1.

A "mix" of chemical moieties in a membrane may be achieved by using a polphosphazene with different ligands on the same backbone, as in Formula 3, or by physically mixing two or more different phosphazene polymers together before casting into a membrane. Therefor, a membrane of an advantageous embodiment may be a single polymer according to either Formula 2 or 3, for example, or a mix of two or more polymers, such as represented by Formula 4:

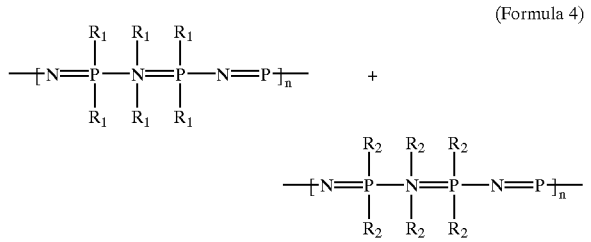

(Formula 4)

wherein n is at least 1. Therefore, Formula 4 represents what can be termed a "mixed polymer," and Formula 3 represents what can be termed a polymer with "mixed side-group ligands" or "mixed substituents."

The present method is expected to be effective for feed solutions ranging from the very acidic (pH 1-2) to basic (pH 12). Very basic feed solutions are expected to cause some damage to many phosphazene polymers.

Illustrative feed temperatures can range from room temperature to approximately 100° C., and a major benefit of the invention is that it can be operated at high temperatures, for example, 50–100° C. Effective separation is expected in a wide range of temperatures, at least from about freezing to about boiling.

Standard separation process steps can be added to the present processes. For example, pre-filtration for removing particulate matter, or back-flushing to remove retained ions on the membrane, are well known in the art and can be used in conjunction with the present invention.

Once the polyphosphazene membrane is chosen and is mechanically supported, a stream of an ion-containing aqueous solution is passed over the membrane. Material that permeates through the membrane (permeate) can be collected, and material that does not pass through the membrane (rejectate) can be collected separately. FIG. 1 shows an illustrative apparatus for carrying out such a separation. The apparatus 10 comprises a stainless steel housing 12 that defines an interior chamber 14. Within the interior chamber 14 is a polyphosphazene-coated ceramic tube 16, having an interior lumen 18. The tube 16 has an inlet port 20 for receiving the ion-containing aqueous stream 22, which comprises water molecules 24 and ions 26. The tube 16 also has an outlet port 28 for conducting the rejectate 30 out of the apparatus. The housing 12 also has an outlet port 32 for conducting the permeate 34 out of the apparatus. In operation, the aqueous stream 22 enters the apparatus through the inlet port 20. Water molecules 24 in the aqueous stream 22 pass through the polyphosphazene-coated tube 16 into the interior chamber 14, and constitute the permeate 34 that is conducted out of the apparatus through outlet port 32. The ions 26 are retained in the lumen 18 of the polyphosphazene-coated tube 16 and constitute the rejectate 30, along with water molecules that do not happen to pass through the polyphosphazene membrane, and are conducted out of the apparatus through outlet port 28. Both the permeate and the rejectate may be processed further or discharged. Thus, the process of the present invention allows separation and recovery of an ion-rich stream and discharge of a cleaner, clear stream.

The following example is merely illustrative of the invention and is not intended to be a limitation on the scope of the invention. The scope of the invention is defined by the claims and equivalents thereof.

EXAMPLE 1

Dehydration of "sodium-bearing nuclear waste" has been of interest for several years at the Idaho National Engineering and Environmental Laboratory. Studies have been conducted to evaluate various technologies to dehydrate the sodium-bearing waste. The requirements for membranes that would be suitable for such applications include radiation, thermal, and chemical resistance, while performing the separation of the metal ions from the water.

A variety of polymeric membranes are commercially available. Most of the membranes are organic materials (such as cellulose, cellulose acetate, polyamides, polyacrylonitrile, polyvinylidenefluoride, polytetrafluoroethylene, and the like) that lack one or more of the above-mentioned requirements, such as thermal, chemical or radiation stability. Many membrane materials have been tested for radiation resistance and have been shown to possess no significant degree of resistance. Silicone rubber was briefly considered as a possible membrane material, but was deemed to be too unstable toward radiation levels that could be expected in the actual sodium-bearing waste.

As described above, phosphazene polymers contain alternating phosphorus-nitrogen single and double bonds in the polymer backbone with two side groups attached to the phosphorus atoms. These polymers can easily be modified with a variety of side groups by nucleophilic substitution and exchange reactions. Three types of polyphosphazene structures (linear, cyclo-linear, and cyclo-matrix) provide variety in the chemical, thermal, and mechanical properties. Linear organo-substituted polyphosphazenes are synthesized by ring cleavage polymerization of a cyclic trimer (usually hexachlorocyclo-triphosphazene) at 250° C. under vacuum, coupled with subsequent substitution by the desired side group. The cyclo-linear and cyclo-matrix polymers are prepared by reacting the cyclic trimer with difunctional monomers. The type of polymer obtained is dependent on the mole ratios of the reactants and reactive sites on the trimer. Chemical and thermal properties of the polymers are related to both the polymer backbone structure and side groups.

Both poly [bis(phenoxy)phosphazene] (PPOP) and poly [(octanoxy)phosphazene] were prepared using a modification of Singler's procedure (R. E. Singler, et al., 12 J. Polymer Science: Polymer Chemistry Edition 433–444 (1974)). Samples of polymer supplied by Elf Atochem, North America, Inc. were characterized by the manufacturer and no further characterization was performed. The molecular weight for PPOP was 750,000 daltons. No molecular weight characterization was performed on the poly[bis (octanoxy)phosphazene].

The polymers were blended in a 1:1 concentration from 5% polymer solutions in tetrahydrofuran (THF). Membranes were then prepared by solution casting from THF solutions onto glass plates. The membrane was then dried for 24 hours and floated off the glass substrate onto water. The membrane was then transferred to a FISHER brand Fast Flow filter paper support. Crosslinking of the polymer was accomplished using dibenzoylperoxide at 200° C. for 8 minutes. After cooling, the membrane was placed inside a stainless steel test cell equipped with a VITON "O" ring forming a seal around the edge of the cell. Film thicknesses and surface structures were determined by freeze fracturing followed by scanning electron microscopic (SEM) examination. All polymer samples were coated with either gold or palladium films (~10 nm) to reduce surface charging on the polymer during SEM examination. Actual thickness measurements were not performed on the membranes used in these studies, but typical polymer film thicknesses were 10–25 μm.

Figure 2:
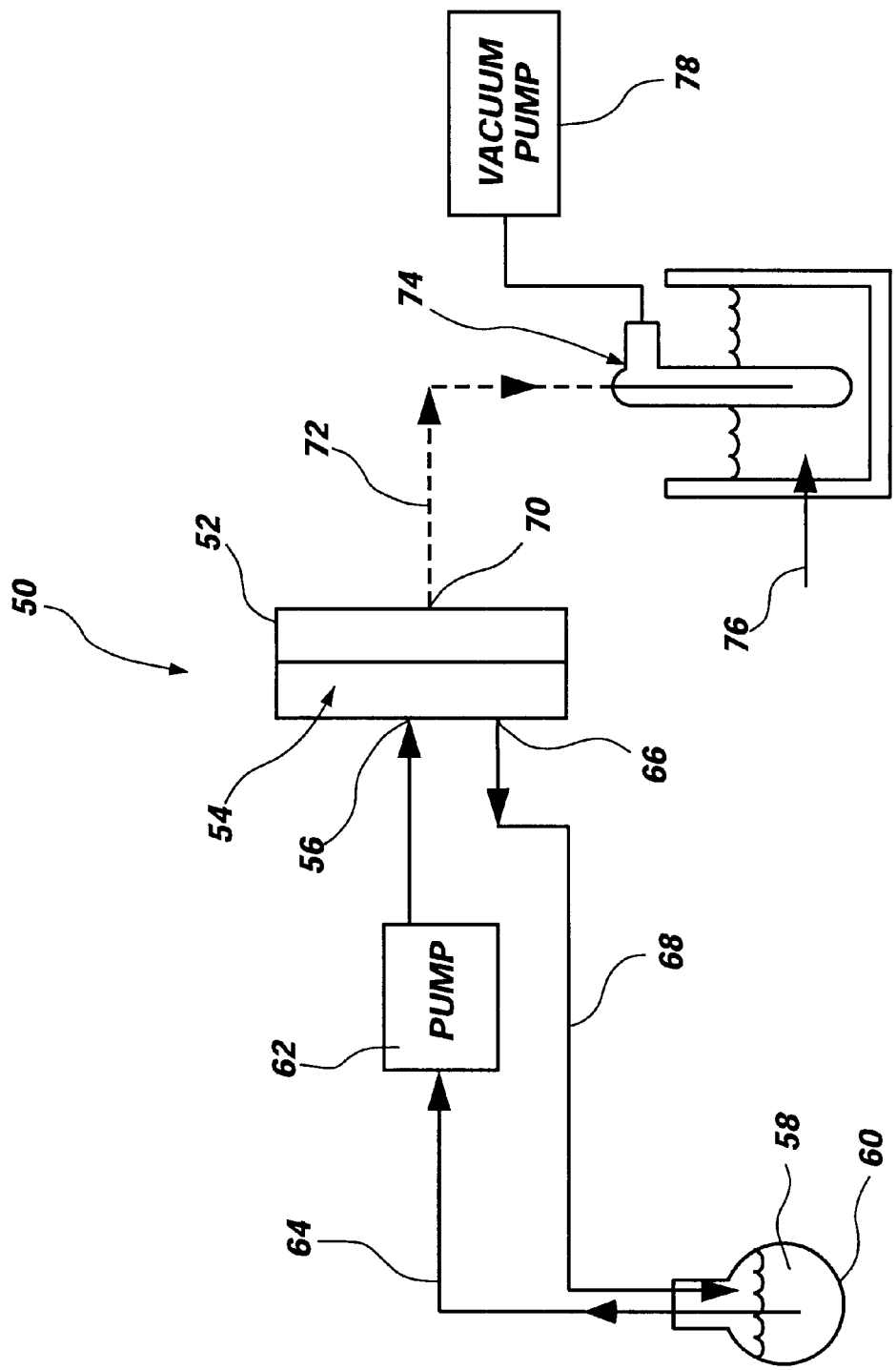
FIG. 2 shows a schematic diagram of a typical membrane pervaporation testing system for use in the present invention.

The 150 cm$^2$, leak checked, flat sheet membranes were mounted in a pervaporation test apparatus with feed and permeate lines attached as shown in FIG. 2. The apparatus 50 comprises a membrane support member 52 for supporting the membrane 54. The membrane support member 52 comprises a feed inlet 56 for inletting the liquid feed solution 58. The liquid feed solution is held in a reservoir 60 and a pump 62 pumps the liquid feed solution out of the reservoir 60 through a feed line 64 into the membrane support member 52. Rejectate returns to the reservoir by exiting the membrane support member 52 through an outlet 66 and being conducted through a return line 68. Vapor that permeates the membrane is pulled out of the membrane support member 52 through a vapor outlet port 70, through a vapor line 72, to a liquid nitrogen trap 74, where the vapor condenses into liquid. The liquid nitrogen trap 74 is cooled in a liquid nitrogen reservoir 76, and a vacuum pump 78 provides the reduced pressure to pull the vapor from the membrane support member 52 to the trap 74.

The membranes were conditioned for 24 to 48 hours at the temperatures specified in Table 1.

TABLE 1

Initial conditions for sodium bearing waste dewatering by pervaporation.
Experimental Conditions:
Sample size: 200 ml, Membrane area: 17 cm$^2$, Temperatures: 22, 45, 55, 60 C.
Nitric acid concentration = 4.2 Molar, Feed flow: 75 cc/min.

| Sample ID | Flux (l/M$^2$-hr) | Permeate (ml) | Test Time (hrs) | Temp. (C.) | Feed pH | Permeate pH | Notes |
|---|---|---|---|---|---|---|---|
| 08084 | 0.008 | 0.5 | 6 | 22 | 0 (?)* | 5 | Clear/Colorless |
| 08094 | 0.009 | 0.8 | 6 | 22 | 0 (?)* | 8 | Clear/Colorless |
| 08104 | 0.010 | 0.9 | 6 | 22 | 0 (?)* | 7 | Clear/Colorless |
| 08114 | 0.009 | 0.8 | 6 | 45 | 0 (?)* | 7 | Clear/Colorless |
| 08124 | 0.008 | 0.9 | 7 | 45 | 0 (?)* | 2 | Clear/Colorless |
| 08154 | 0.027 | 2.9 | 7 | 60 | 0 (?)* | 0 | Clear/Colorless |
| 08164 | 0.058 | 6.2 | 7 | 55 | 0 (?)* | 1 | Clear/Colorless |
| 08174 | 0.056 | 5.2 | 6 | 55 | 0 (?)* | 1 | Clear/Colorless |
| 08184 | 0.060 | 6.6 | 7 | 55 | 0 (?)* | 0 | Clear/Colorless |

*pH is not defined under these conditions, so a value of "0" was assigned

The feed was a surrogate sodium-bearing waste solution supplied by Westinghouse Idaho Nuclear Company. Permeate samples were collected at 4, 6, and 7 hours after the system was started. The permeate samples were analyzed using inductively coupled plasma atomic emission spectroscopy (ICP-AES).

The results of the sodium-bearing waste membrane testing experiments are shown in Table 1. Surprisingly, the sodium, aluminum, cadmium, chromium, copper, nickel, and strontium ions showed very high rejections by the membrane, and very clean water came through the membrane, with some discoloration as shown in Table 2.

TABLE 2

Metals analyses for selected sodium bearing waste pervaporation experiments
Final Experimental Conditions:
Feed Sample size: 200 ml, Membrane area: 17 cm$^2$,
Initial nitric acid concentration: 4.2 Molar, Final nitric acid concentration: 4.9 Molar,
Final feed flow: 75 cc/min., Total removal of water in 4 hours: 26 ml.

| Metal Ion | Feed Conc. (ppm) | Perm Conc. (ppm) | % Rejection by membrane |
|---|---|---|---|
| Sample ID: 08164W | | | |
| Al | 14651 | 3.3 | 99.98 |
| Cd | 208 | 0 | 99.99 |
| Cr | 287 | 0 | 99.99 |
| Cu | 158 | 0 | 99.99 |
| Na | 25139 | 14.7 | 99.90 |
| Na | 112 | 0 | 99.95 |
| Cs | — | | |
| Sample ID: 08184W | | | |
| Al | 16337 | 1.9 | 99.99 |
| Cd | 235 | 0 | 99.99 |
| Cr | 332 | 0 | 99.99 |
| Cu | 309 | 0 | 99.99 |
| Na | 28443 | 11 | 99.96 |
| Cs | — | | |

Interestingly, over time the color of the water changed from clear and colorless to clear and light yellow. Additionally, the permeate pH dropped from about 6 to 0 over several days of operation.

The flux through a membrane is expressed as the volume of material to pass through the membrane of one square meter surface area in one hour. The fluxes that were observed were reasonable and showed the expected increase with temperature increase.

The results presented in Table 2 were unexpected and surprising. The fact that metal ions can be retained using a pervaporation membrane was not previously known.

Several approaches may be taken to express separation efficiency. First, the flux, which is shown in Table 1, must be considered, and second, the amount of contaminant material actually passing through the membrane with the flux must be considered. If the membrane shows very high separation specificity and low flux, it is not practical to use. Similarly, if a membrane shows high flux and low specificity for separation, it is probably not practical for application, as well. Thus, the ideal membrane is one that exhibits both high specificity and reasonable flux.

The separation factor ($\alpha$), equation 1, is commonly used to explain separation specificity:

$$\alpha = \frac{\frac{[A]_{feed}}{[B]_{feed}}}{\frac{[A]_{permeate}}{[B]_{permeate}}} \quad \text{(Equation 1)}$$

where the concentrations of the individual components are expressed in moles or ppm. Very large numbers represent good separations. For example, if a separation is performed for which the following hold:
Concentration of Feed Component A=99%
Concentration of Feed Component B=1%
Concentration of Permeate Component A=1%
Concentration of Permeate Component B=99%

The separation factor for this example is $\alpha$=10,000. This example is of a membrane with a very high specificity.

For many applications this concept works well. In some cases, however, such as for metal ions, in a very large excess of water a better way to express the separation ability of a membrane is needed. In such cases, the concept of "membrane rejection" is more appropriate. In the concept of membrane rejection, a determination is made of the percentage of material that passes through the membrane, and the separation ability of the membrane is expressed as a percentage of the material that did not pass through the membrane. Thus, the rejection of a membrane is a reasonably direct measure of the cleanliness of a permeate stream. In the example above it would be said that the membrane showed 99% rejection of component A.

The results of Table 2 show very high rejection of the metal ions and reasonable fluxes using the polyphosphazene membranes. These unexpected and surprising results suggest the feasibility of using membrane technology for dewatering sodium-bearing waste and similar problems in the nuclear industry.

We claim:

1. A method for separating ions from an aqueous stream containing such ions, comprising:
   placing a phosphazene polymer membrane in a pervaporation apparatus and contacting the phosphazene polymer membrane with the aqueous stream such that water vapor permeates the phosphazene polymer membrane and the ions are substantially prevented from permeating the phosphazene polymer membrane to produce an ion-depleted permeate stream and an ion-enhanced rejectate; and
   separately collecting the ion-depleted permeate stream and the ion-enhanced rejectate to separate the ions from the aqueous stream containing the ions, wherein the ions are selected from the group consisting of aluminum, cadmium, copper, nickel, and strontium ions.

2. The method of claim 1, wherein said phosphazene polymer membrane comprises a linear polyphosphazene.

3. The method of claim 1, wherein said phosphazene polymer membrane comprises a cyclo-linear polyphosphazene.

4. The method of claim 1, wherein said phosphazene polymer membrane comprises a cyclo-matrix polyphosphazene.

5. The method of claim 1, wherein said phosphazene polymer membrane comprises a mixture of linear polyphosphazenes, cyclo-linear polyphosphazenes, and cyclo-matrix polyphosphazenes.

6. The method of claim 1, wherein said phosphazene polymer membrane comprises side-groups comprising organic functionality.

7. The method of claim 6, wherein said phosphazene polymer membrane comprises a phenoxy substituent bonded to phosphorus.

8. The method of claim 6, wherein said phosphazene polymer membrane comprises an octanoxy substituent bonded to phosphorus.

9. The method of claim 1, wherein said ions comprise a mixture of aluminum, cadmium, chromium, copper, nickel, and strontium ions.

10. A method for removing and concentrating ions from an aqueous ion-containing solution having a first volume, comprising:
    placing a phosphazene polymer membrane in a pervaporation apparatus and contacting the phosphazene polymer membrane with the ion-containing solution such that the ions are retained in an ion-enhanced rejectate and an ion-depleted permeate passes through the phosphazene polymer membrane, wherein the ion-enhanced rejectate has a second volume that is smaller than the first volume; and
    collecting the ion-enhanced rejectate to remove and concentrate the ions from the aqueous ion-containing solution, wherein the ions are selected from the group consisting of aluminum, cadmium, copper, nickel, and strontium ions.

11. The method of claim 10, wherein said phosphazene polymer membrane comprises a linear polyphosphazene.

12. The method of claim 10, wherein said phosphazene polymer membrane comprises a cyclo-linear polyphosphazene.

13. The method of claim 10, wherein said phosphazene polymer membrane comprises a cyclo-matrix polyphosphazene.

14. The method of claim 10, wherein said phosphazene polymer membrane comprises a mixture of linear polyphosphazenes, cyclo-linear polyphosphazenes, and cyclo-matrix polyphosphazenes.

15. The method of claim 10, wherein said phosphazene polymer membrane comprises side-groups comprising organic functionality.

16. The method of claim 15, wherein said phosphazene polymer membrane comprises a phenoxy substituent bonded to phosphorus.

17. The method of claim 15, wherein said phosphazene polymer membrane comprises a octanoxy substituent bonded to phosphorus.

18. The method of claim 10, wherein said ions comprise a mixture of aluminum, cadmium, chromium, copper, nickel, and strontium ions.

19. A method for dewatering an aqueous ion-containing stream, comprising:
    placing a phosphazene polymer membrane in a pervaporation apparatus and contacting the phosphazene polymer membrane with the aqueous stream such that the ions selected from the group consisting of aluminum, cadmium, copper, nickel, and strontium ions are substantially prevented from permeating the phosphazene polymer membrane and water vapor permeates the phosphazene polymer membrane to produce an ion-depleted permeate stream and an ion-enriched rejectate; and collecting the ion-enriched rejectate to dewater the aqueous ion-containing stream.

20. The method of claim 19, wherein said phosphazene polymer membrane comprises a linear polyphosphazene.

21. The method of claim 19, wherein said phosphazene polymer membrane comprises a cyclo-linear polyphosphazene.

22. The method of claim 19, wherein said phosphazene polymer membrane comprises a cyclo-matrix polphosphazene.

23. The method of claim 19, wherein said phosphazene polymer membrane comprises a mixture of linear polyphosphazenes, cyclo-linear polyphosphazenes, and cyclo-matrix polyphosphazenes.

24. The method of claim 19, wherein said phosphazene polymer membrane comprises side-groups comprising organic functionality.

25. The method of claim 24, wherein said phosphazene polymer membrane comprises a phenoxy substituent bonded to phosphorus.

26. The method of claim 24, wherein said phosphazene polymer membrane comprises an octanoxy substituent bonded to phosphorus.

27. The method of claim 19, wherein said ions comprise a mixture of aluminum, cadmium, chromium, copper, nickel, and strontium ions.

28. A method for separating ions from an aqueous stream containing such ions, comprising:

placing a phosphazene polymer membrane in a reverse osmosis apparatus and contacting the phosphazene polymer membrane with the aqueous stream such that water permeates the phosphazene polymer membrane and the ions are substantially prevented from permeating the phosphazene polymer membrane to produce an ion-depleted permeate stream and an ion-enhanced rejectate, wherein the ions are selected from the group consisting of aluminum, cadmium, copper, nickel, and strontium ions; and separately collecting the ion-depleted permeate stream and the ion-enhanced rejectate to separate the ions from the aqueous stream containing the ions.

29. A method for removing and concentrating ions from an aqueous ion-containing solution having a first volume, comprising:

placing a phosphazene polymer membrane in a reverse osmosis apparatus and contacting the phosphazene polymer membrane with the ion-containing solution such that the ions are retained in an ion-enhanced rejectate and an ion-depleted permeate passes through the phosphazene polymer membrane, wherein the ion-enhanced rejectate has a second volume that is smaller than the first volume and wherein the ions are selected from the group consisting of aluminum, cadmium, copper, nickel, and strontium ions; and collecting the ion-enhanced rejectate to remove and concentrate the ions from the aqueous ion-containing solution.

30. A method for dewatering an aqueous ion-containing stream, comprising:

placing a phosphazene polymer membrane in a reverse osmosis apparatus and contacting the phosphazene polymer membrane with the aqueous stream such that the ions are substantially prevented from permeating the phosphazene polymer membrane and water permeates the phosphazene polymer membrane to produce an ion-depleted permeate stream and an ion-enriched rejectate, wherein the ions are selected from the group consisting of aluminum, cadmium, copper, nickel, and strontium ions; and collecting the ion-enriched rejectate to dewater the aqueous ion-containing stream.

* * * * *